United States Patent
Huang

(10) Patent No.: US 7,980,845 B2
(45) Date of Patent: Jul. 19, 2011

(54) MOLDING APPARATUS

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 342 days.

(21) Appl. No.: 12/261,295

(22) Filed: Oct. 30, 2008

(65) Prior Publication Data

US 2009/0194667 A1 Aug. 6, 2009

(30) Foreign Application Priority Data

Jan. 31, 2008 (CN) .......................... 2008 1 0300284

(51) Int. Cl.
*B28B 17/00* (2006.01)
*B28B 3/00* (2006.01)
*B41B 11/62* (2006.01)

(52) U.S. Cl. ........ 425/182; 425/193; 425/195; 425/408; 425/808; 249/102

(58) Field of Classification Search .............. 425/192 R, 425/185, 808, 193, 182, 408, 411, 412; 249/139, 249/142, 102
See application file for complete search history.

(56) References Cited

U.S. PATENT DOCUMENTS

| | | | |
|---|---|---|---|
| 4,540,534 A * | 9/1985 | Grendol | 264/2.2 |
| 4,861,254 A * | 8/1989 | Takeuchi et al. | 425/190 |
| 4,911,632 A * | 3/1990 | Mansfield | 425/183 |
| 6,120,279 A * | 9/2000 | Vovan | 425/190 |
| 6,196,824 B1 * | 3/2001 | Foltuz et al. | 425/190 |
| 2003/0033833 A1 * | 2/2003 | Fujimoto et al. | 65/102 |
| 2005/0212154 A1 * | 9/2005 | Inoue et al. | 264/1.32 |

* cited by examiner

Primary Examiner — Maria Veronica D Ewald
(74) Attorney, Agent, or Firm — Andrew C. Cheng

(57) ABSTRACT

A molding apparatus includes a first mold half, a first mold core, a second mold half, a second mold core and a plurality of spacers. The first mold core is received in the first mold half and has a first molding surface. The second mold half includes a receiving cavity defined therein and a plurality of parallel grooves angularly equidistantly spaced from each other. The second mold core is received in the receiving cavity and has a second molding surface facing the first molding surface. The first and second molding surfaces are configured for cooperatively defining a molding cavity therebetween. The spacers are configured for being selectively disposed in the corresponding grooves. Each spacer is configured for being sandwiched between the second mold half and the second mold core. The spacers are configured for aligning the second molding surface with the first molding surface.

5 Claims, 7 Drawing Sheets

MOLDING APPARATUS

CROSS-REFERENCE TO RELATED APPLICATIONS

This application is related to commonly-assigned co-pending applications Ser. No. 12/251,724, entitled "MOLDING APPARATUS", and Ser. No. 12/261,292, entitled "MOLDING APPARATUS". Disclosures of the above-identified application are incorporated herein by reference.

BACKGROUND

1. Field of the Invention

The present invention relates to a molding apparatus.

2. Description of Relate Art

Molding apparatuses are widely used for manufacturing optical articles, such as light guide plates, lenses, and etc. For lenses, concentricity of the two opposite surfaces is an important factor in molding precision.

Referring to FIG. 7, a typical molding apparatus 10 for molding an optical lens 12 includes a first mold part 100 and a second mold part 110 facing the first mold part 100. A first mold core 120 is mounted in the first mold part 100, and a second mold core 130 is mounted in the second mold part 110. The first mold core 120 has a first curved molding surface 122, and the second mold core 130 has a second curved molding surface 132 facing the first curved molding surface 122. A molding chamber is defined between the first molding surface 122 and the second molding surface 132.

As shown in FIG. 7, when assembling the first and second mold part 100 and 110 together, a loss of concentricity may occur between the first and second molding surfaces 122 and 132. This leads to difficulty in assembly and disassembly of the first and second mold parts 100 and 110, and abrasion of the mold cores 120 and 130 may occur after repeatedly use. In addition, disassembly and modification of the molding apparatus may be needed, thus reducing molding efficiency and increasing cost.

Therefore, a molding apparatus is desired to overcome the above-described deficiencies.

SUMMARY

A molding apparatus includes a first mold half, a first mold core, a second mold half, a second mold core and a plurality of spacers. The first mold core is received in the first mold half. The first mold core has a first molding surface. The second mold half is positioned opposite to the first mold half. The second mold half includes a receiving cavity defined therein and a plurality of parallel grooves being angularly equidistantly spaced from each other. The second mold core is received in the receiving cavity of the second mold half. The second mold core has a second molding surface facing the first molding surface. The first molding surface and the second molding surface are configured for cooperatively defining a molding cavity therebetween. The plurality of spacers are configured for being selectively disposed in the corresponding grooves. Each of the spacers is configured for being sandwiched between the second mold half and the second mold core. The plurality of spacers are configured for aligning the second molding surface with the first molding surface.

Advantages and novel features will become more apparent from the following detailed description of the present molding apparatus, when taken in conjunction with the accompanying drawings.

BRIEF DESCRIPTION OF THE DRAWINGS

Many aspects of the present molding apparatus can be better understood with reference to the following drawings. The components in the drawings are not necessarily drawn to scale, the emphasis instead being placed upon clearly illustrating the principles of the present molding apparatus. Moreover, in the drawings, like reference numerals designate corresponding parts throughout the several views.

DETAILED DESCRIPTION OF THE EMBODIMENT

Reference will now be made to the drawings to describe embodiments of the present molding apparatus.

Figure 1:
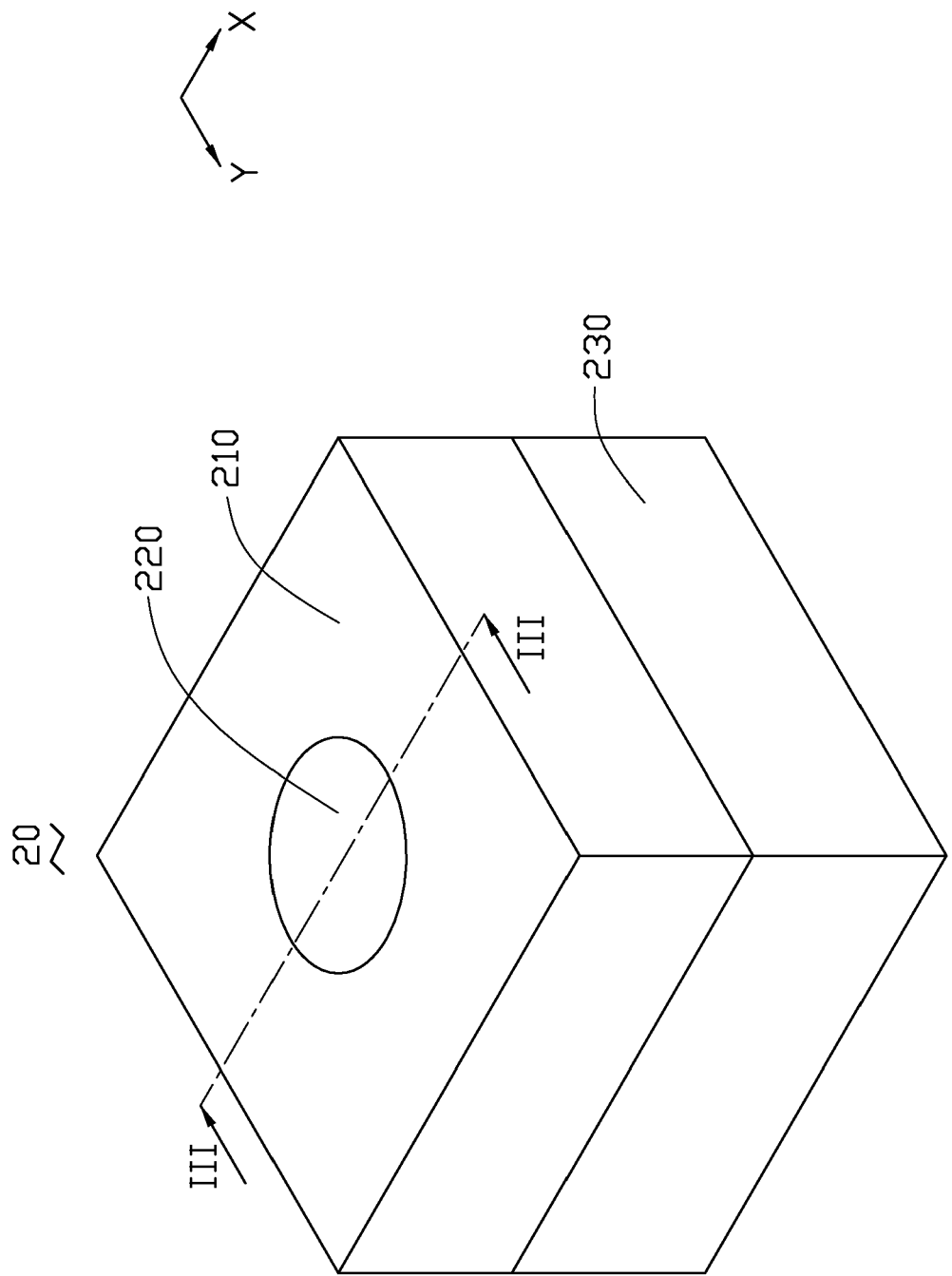
FIG. 1 is an assembled isometric view of a molding apparatus according to an embodiment, the molding apparatus including a sleeve and a core insert.
Figure 2:
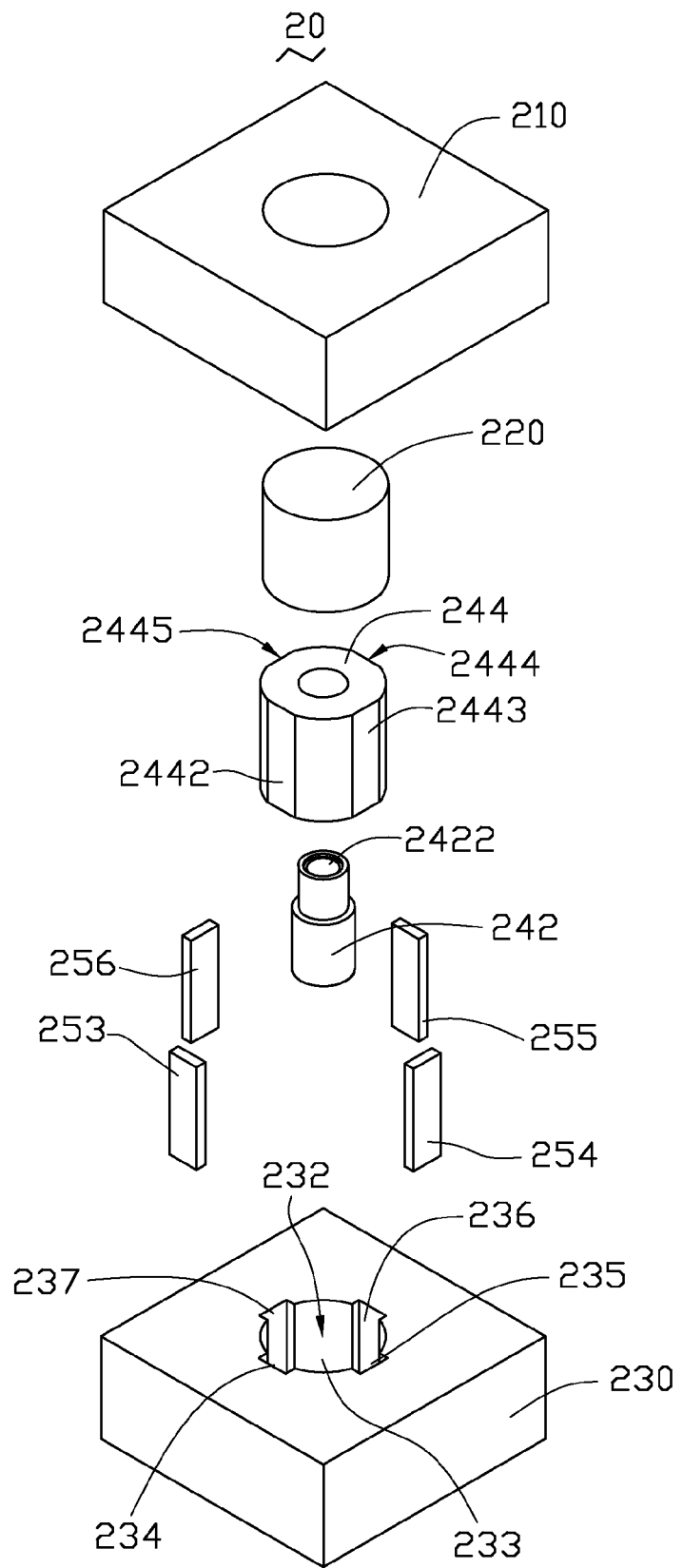
FIG. 2 is an exploded isometric view of the molding apparatus shown in FIG. 1.

Referring to FIGS. 1 and 2, a molding apparatus 20 includes a first mold half 210, a first mold core 220 installed in the first mold half 210, a second mold half 230, and a second mold core 240 (see FIG. 3) installed in the second mold half 230.

The first mold core 220 is matingly installed in the first mold half 210. The first mold core 220 has a first curved, molding surface 222 with a principal axis O (see FIG. 6).

A receiving cavity 232 is defined in the second mold half 230 and extends through the second mold half 230. The second mold core 240 is received in the receiving cavity 232. The second mold core 240 includes a core insert 242 and a sleeve 244 for receiving the core insert 242. The core insert 242 is matingly received in the sleeve 244. In this embodiment, the core insert 242 has a stepped structure. A second, curved molding surface 2422 with a principal axis O' is defined in an end face (not labeled) of the core insert 242 (see FIG. 6). The sleeve 244 is received in the receiving cavity 232.

The sleeve 244 is cylinder-shaped. The sleeve 244 has four flat side surfaces 2442, 2443, 2444 and 2445 parallel with the principal axis of the sleeve 244. The four flat side surfaces 2442, 2443, 2444 and 2445 are angularly equidistantly distributed at a cross-sectional plane of the sleeve 244 and adjacent one another. Thus, the flat side surface 2442 is positioned opposite to and parallel with the flat side surface 2444, and the flat side surface 2443 is positioned opposite to and parallel with the flat side surface 2445.

The receiving cavity 232 has a cylinder shape and is defined by an inner surface 233 of the second mold half 230. A radius of the receiving cavity 232 is greater than the radius of the sleeve 244. The radius of the receiving cavity 232 is about 0.01 millimeter less than the radius of the sleeve 244. Four grooves 234, 235, 236, and 237 are defined in the inner surface 233. The four grooves 234, 235, 236, and 237 are angularly equidistantly distributed at a cross-sectional plane of the second mold half 230, and extend along directions parallel with a principal axis of the receiving cavity 232. In assembly, the groove 234 is arranged facing the flat side surface 2442, the groove 235 is arranged facing the flat side surface 2443, the groove 236 is arranged facing the flat side surface 2444, the groove 237 is arranged facing the flat side surface 2445.

Figure 3:
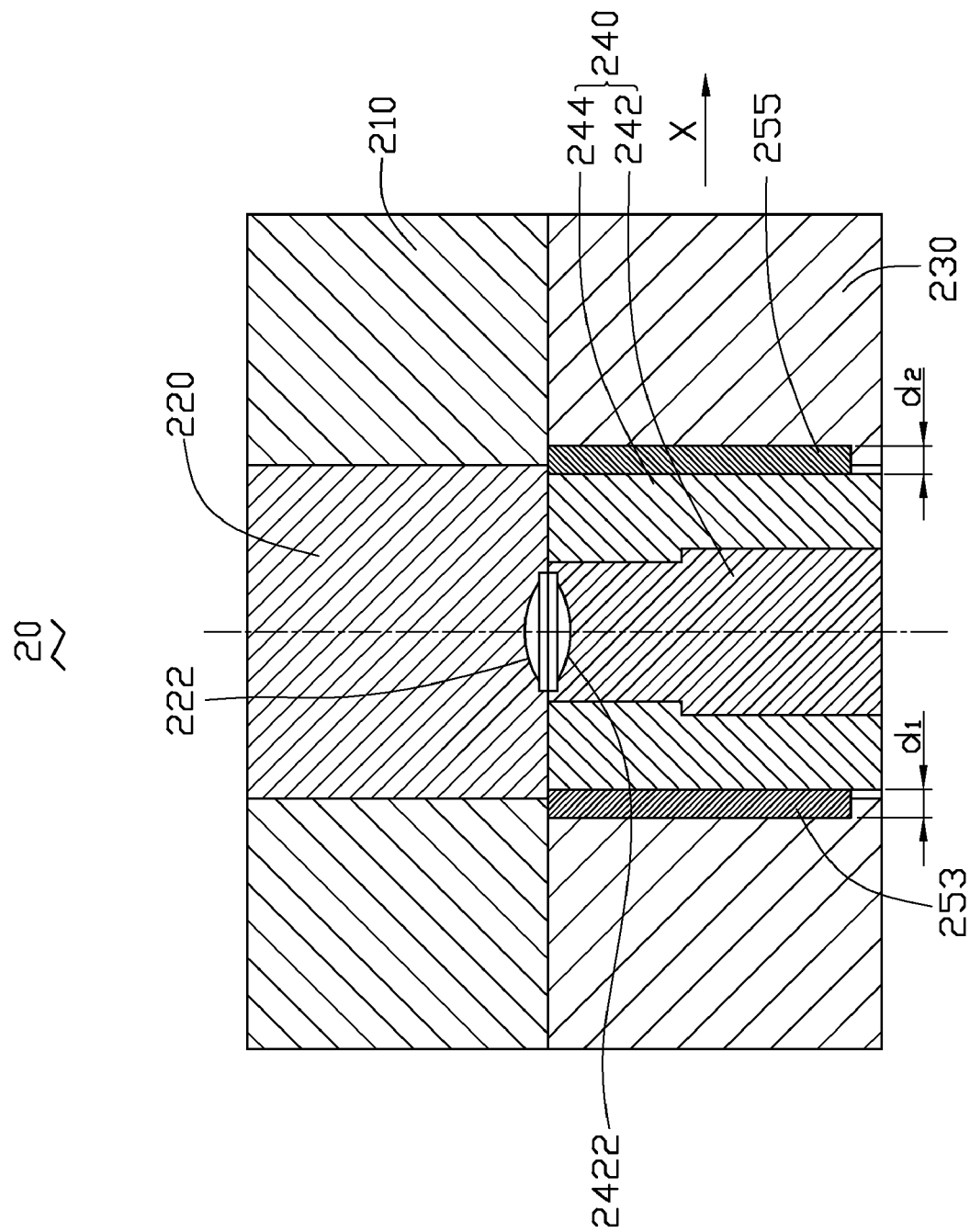
FIG. 3 is a cross-sectional view of the molding apparatus of FIG. 1, taken along line III-III thereof.

Referring to FIGS. 2 and 3, the first mold core 220 is installed in the first mold half 210. The core insert 242 is installed in the sleeve 244. The sleeve 244 is installed in the receiving cavity 232 of the second mold half 230 in a manner that the four flat side surfaces 2442, 2443, 2444 and 2445 are positioned correspond to the four corresponding grooves 234, 235, 236 and 237. A spacer 253 is positioned between the flat side surface 2442 and a bottom surface of the groove 234, a spacer 254 is positioned between the flat side surface 2443 and a bottom surface of the groove 235, a spacer 255 is positioned between the flat side surface 2444 and a bottom surface of the groove 236, and a spacer 256 is positioned between flat side surface 2445 and a bottom surface of the groove 237. Each of the fours spacers contacts the corresponding plane of the sleeve 244 and the bottom surface of the corresponding groove in the second mold half 230.

The spacers 253, 254, 255 and 256 can be replaced by other spacers with different thicknesses to adjust the position of the sleeve 244 in the second mold half 230, thus the position of the core insert 242 in the second mold half 230 can be adjusted. Proper thickness of the spacers allows the first molding surface 222 to be coaxial with the second molding surface 2422. A molding cavity 246 (see FIG. 6) is defined between the first molding surface 222 and the second molding surface 2422.

Figure 4:
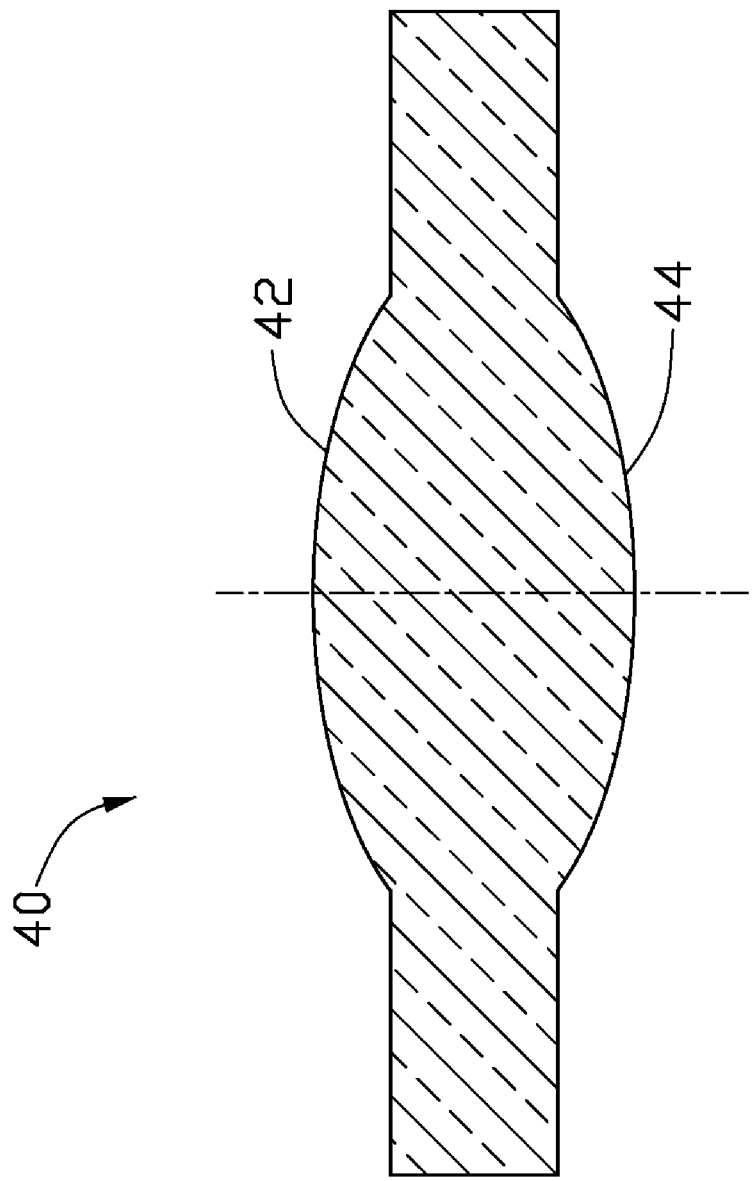
FIG. 4 is a cross-sectional view of a lens formed by the molding apparatus shown in FIG. 1.

Referring to FIG. 4, a lens 40 molded by the molding apparatus 20 is shown. The lens 40 has two curved surfaces 42 and 44 opposite to each other, wherein the surface 42 is formed corresponding to the second molding surface 2022 and the surface 44 is formed corresponding to the first molding surface 222. The curved surface 42 is coaxial with the curved surface 44.

It is understood that the flat side surfaces 2442, 2443, 2444 and 2445 may be convex surfaces instead. In such case, each of the spacers can have a concave surface to mate with the outer surface of the sleeve 244.

Figure 5:
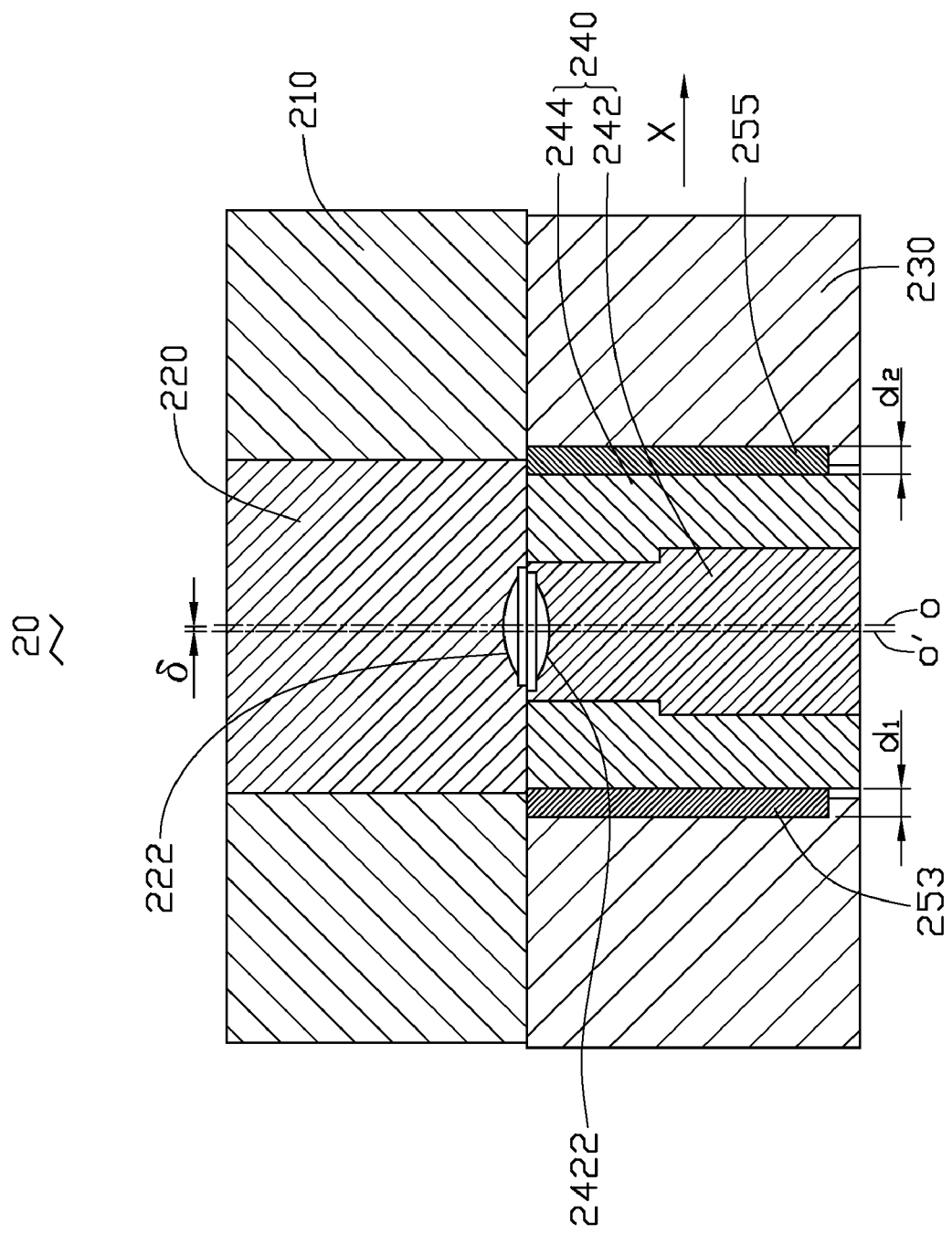
FIG. 5 is a cross-sectional view showing a first mold core misaligned with a second mold core.
Figure 6:
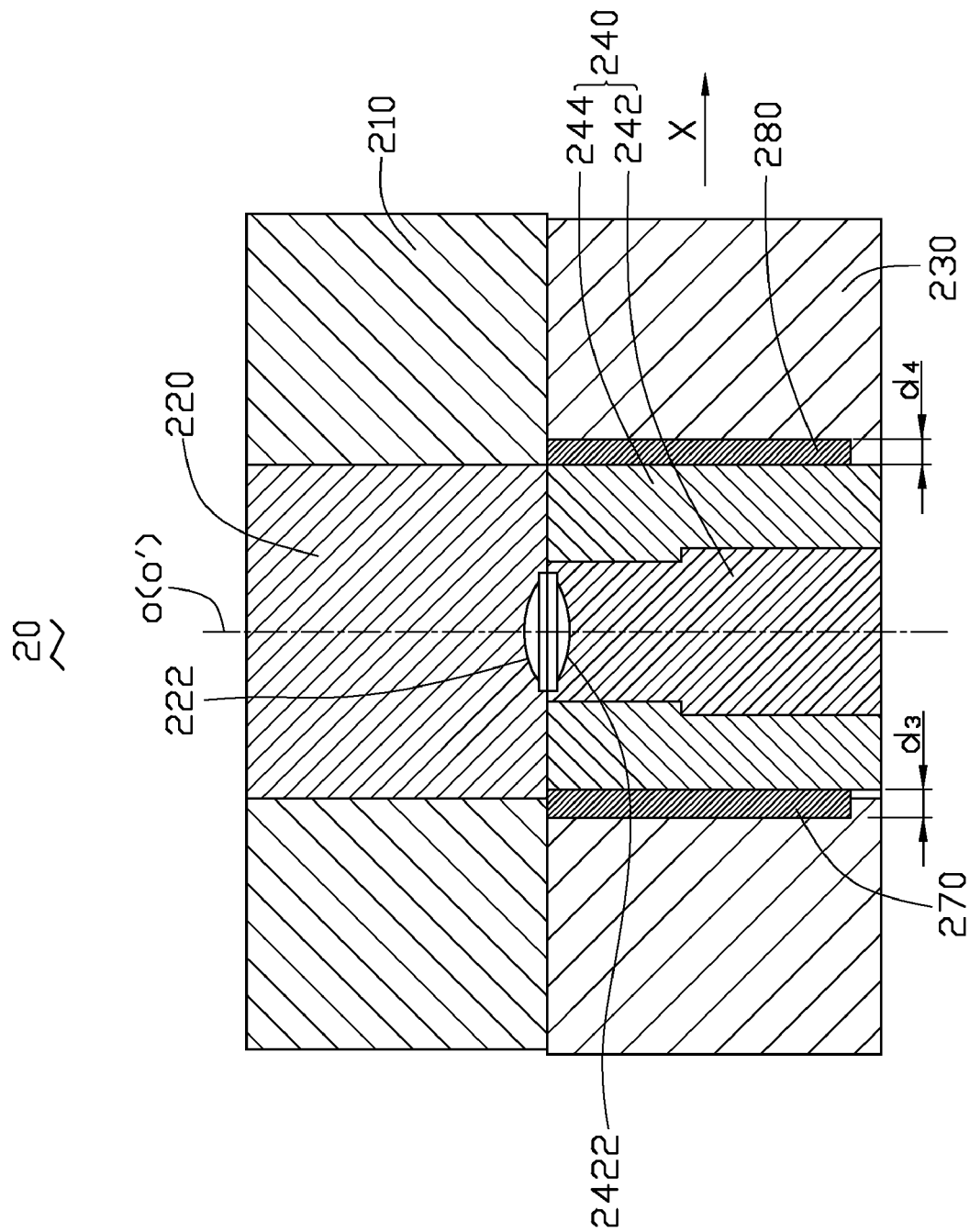
FIG. 6 is a cross-sectional view showing the first mold core aligned with the second mold core using spacers of the molding apparatus of FIG. 1.
Figure 7:
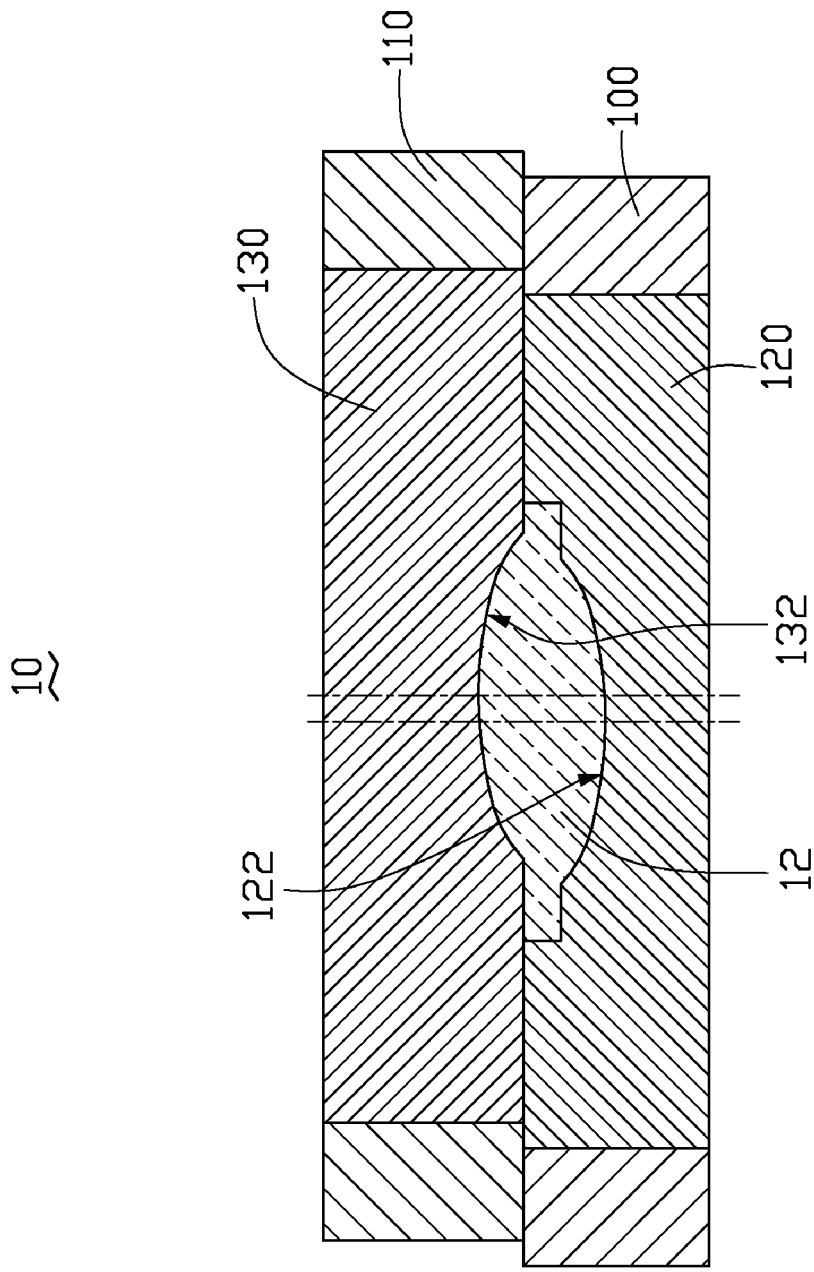
FIG. 7 is a cross-sectional view of a typical molding apparatus.

Referring to FIGS. 5 and 6, a concentricity adjusting method using the spacers of the molding apparatus 20, when an eccentricity/misalignment between the first molding surface 222 and the second molding surface 2422 occurs, is described in detail as follows.

Referring to FIG. 5, the first mold half 210 and the second mold 230 are assembled together. The first molding surface 222 faces the second molding surface 2422. In this step, there is a lateral alignment tolerance δ along a X direction in FIG. 5 between the principal axis O of the first molding surface 222 and the principal axis O' of the second molding surface 2422. The X direction is perpendicular with the flat side surfaces 2442 and 2444. The spacer 253 has a thickness d1 and the spacer 255 has a thickness d2. The spacer 253 contacts the flat side surface 2442 and the bottom surface of the groove 234, and the spacer 255 contacts the flat side surface 2444 and the bottom surface of the groove 236.

The lateral alignment tolerance δ can be measured by a three-coordinate measuring machine. One method of measuring the lateral alignment tolerance δ is to measure coordinate values of the centers of the first and second molding surface 222 and 2422 and calculate a distance between the centers of the first and second molding surface 222 and 2422 at the X direction, to obtain the lateral alignment tolerance δ. Another method is to measure a lateral alignment tolerance δ' between two opposite curved surfaces of a lens molded by the molding apparatus 20 and infer the lateral alignment tolerance δ based on the lateral alignment tolerance δ'.

Referring to FIG. 6, the spacer 253 and 255 are replaced by a spacer 270 having a thickness d5 and a spacer 280 having a thickness d6, respectively. The thickness d5 is the thickness d1 plus the lateral alignment tolerance δ, i.e. d5=d1+δ. The thickness D6 equals the thickness d2 minus the lateral alignment tolerance δ, i.e. d6=d1−δ. In such case, the lateral alignment tolerance δ between the first molding surface 222 and the second molding surface 2422 are corrected. Thus, the first molding surface 222 becomes coaxial with the second molding surface 2422.

When the lateral alignment tolerance between the first and second molding surfaces 222 and 2422 is along a Y direction perpendicular with the flat side surfaces 2443 and 2445, replacing the spacers 254 and 256 can resolve the problem. Additionally, when the lateral alignment tolerance between the first and second molding surface 222 and 2422 is inclined to the directions X and Y, replacing all the four spacers 253, 254, 255 and 256 can resolve the problem.

It is to be understood that the number of the spacer and the corresponding groove defined in the inner surface 233 of the second mold half 244 can be two, three or more than four.

In this embodiment, the lateral alignment tolerance between the first molding surface 222 and the second molding surface 2422 can be correctable by replacing the spacers 253, 254, 255 and 256 with the correct thickness spacers. This can avoid modification of the molding apparatus 20, thus increasing efficiency and reducing cost of manufacture It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A molding apparatus comprising:
a first mold half;
a first mold core received in the first mold half, the first mold core having a first molding surface;
a second mold half positioned opposite to the first mold half, the second mold half including a receiving cavity defined therein, the receiving cavity being cylinder-shaped, the second mold half including an inner surface in the receiving cavity and a plurality of parallel grooves defined in the inner surface, the grooves being angularly equidistantly spaced from each other; and
a second mold core received in the receiving cavity of the second mold half, the second mold core comprising a sleeve and a core insert received in the sleeve, the sleeve being cylinder-shaped, a radius of the sleeve being less than the radius of the receiving cavity, the sleeve comprising a plurality of flat side surfaces, the core insert having a second molding surface facing the first molding surface, the first molding surface and the second molding surface configured for cooperatively defining a molding cavity therebetween; and
a plurality of spacers configured for being selectively disposed in the corresponding grooves, each of the spacers configured for being sandwiched between the second mold half and the sleeve, the plurality of flat side surfaces of the sleeve being configured for coming into contact with the corresponding spacers, the plurality of spacers being configured for aligning the second molding surface with the first molding surface.

2. The molding apparatus of claim 1, wherein the radius of the receiving cavity is about 0.01 millimeter less than the radius of the sleeve.

3. The molding apparatus of claim 1, wherein the number of the grooves is four, and the four grooves are parallel with each other.

4. The molding apparatus of claim 1, wherein the first molding surface is a curved surface with a first principal axis, the second molding surface is a curved surface with a second principal axis, the first molding surface being configured for coaxial alignment with the second molding surface.

5. A molding apparatus:

a first mold half;

a first mold core received in the first mold half, the first mold core having a first molding surface;

a second mold half positioned opposite to the first mold half, the second mold half including a receiving cavity defined therein, and a plurality of parallel grooves defined in an inner surface thereof in the receiving cavity, the receiving cavity being cylinder-shaped, the grooves being angularly equidistantly spaced from each other; and a second mold core received in the receiving cavity of the second mold half, the second mold core comprising a sleeve and a core insert received in the sleeve, the sleeve being cylinder-shaped, a radius of the sleeve being less than the radius of the receiving cavity, the sleeve having a plurality of flat side surfaces, the core insert having a second molding surface facing the first molding surface, the first molding surface and the second molding surface configured for cooperatively defining a molding cavity therebetween; and a plurality of spacers, at least one of the spacers being selectively arranged in corresponding at least one of the grooves between the second mold half and the sleeve, the plurality of flat side surfaces of the sleeve being configured for coming into contact with the corresponding spacers.

* * * * *